Feb. 1, 1966 W. L. SCHOTT ETAL 3,231,987
DRIVER TRAINING APPARATUS
Filed Feb. 13, 1961 3 Sheets-Sheet 1

INVENTORS:
Walter L. Schott
Reinhard P. Stern

Smyth, & Roston

Attorneys

Feb. 1, 1966 W. L. SCHOTT ETAL 3,231,987
DRIVER TRAINING APPARATUS
Filed Feb. 13, 1961 3 Sheets-Sheet 2

INVENTORS:
Walter L. Schott
Reinhard P. Stern

Smyth & Roston
Attorneys

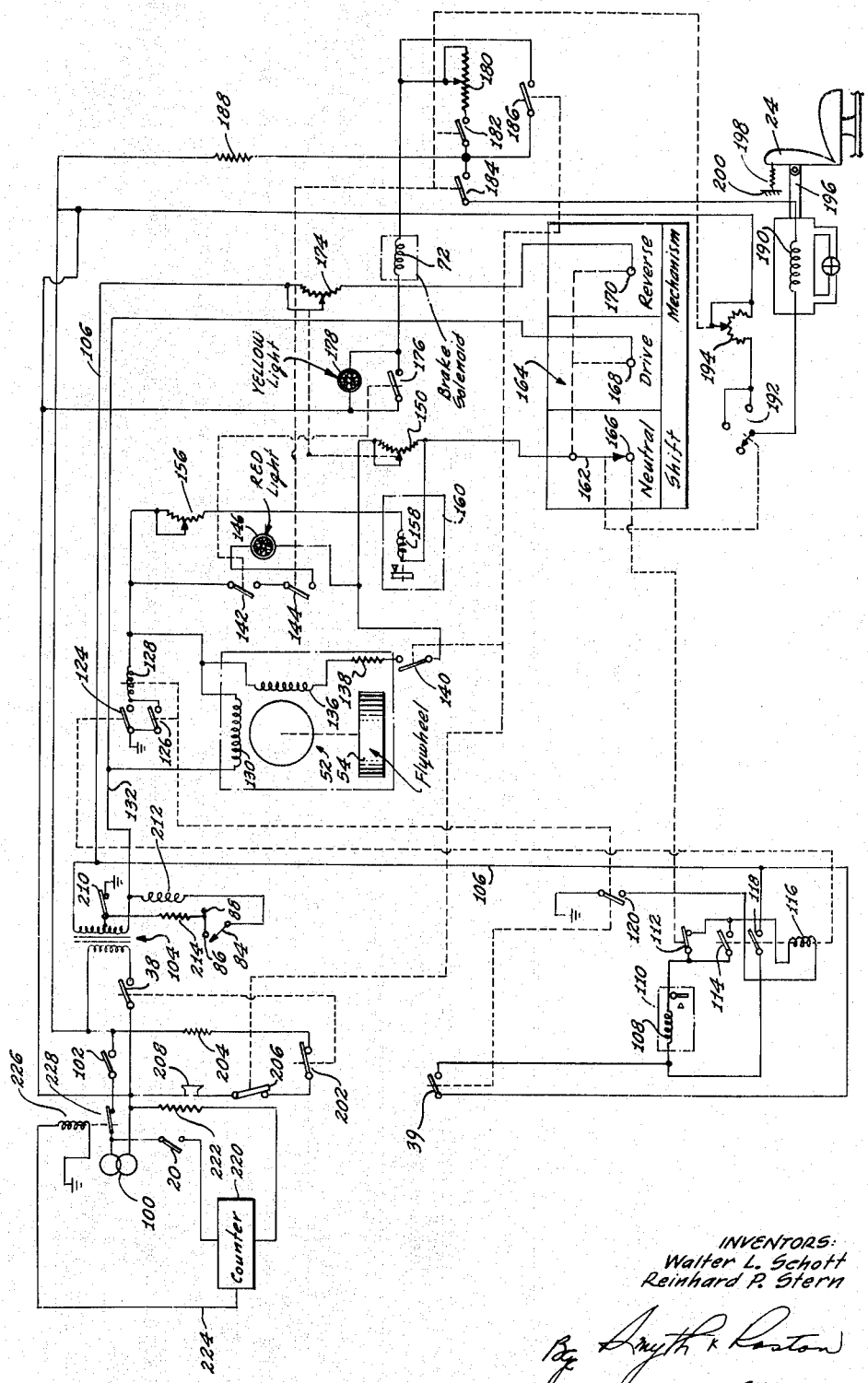

United States Patent Office 3,231,987
Patented Feb. 1, 1966

3,231,987
DRIVER TRAINING APPARATUS
Walter L. Schott, 9390 Monte Leon Lane, Beverly Hills, Calif., and Reinhard P. Stern, 10341 Almayo Ave., Los Angeles, Calif.
Filed Feb. 13, 1961, Ser. No. 90,158
15 Claims. (Cl. 35—11)

This application is a continuation-in-part of copending application Serial No. 765,441 (now abandoned), filed October 6, 1958, by me for "Driver Training Apparatus."

This invention relates to apparatus for training students how to drive an automobile and particularly relates to apparatus for training students in certain important operations including the coordinated use of their eyes, feet and hands.

Experienced drivers may no longer be conscious of the considerable skill and coordination required to drive an automobile properly. This results from the fact that experienced drivers are now operating an automobile by habit. Because of this, experienced drivers do not have to concentrate entirely on the different operations required to obtain a proper control over the movements of the automobile at all times. For a beginner, however, the proper manipulations of the different controls and the proper coordinations between eyes, hands and feet can be quite difficult.

The difficulties experienced by a beginner are especially apparent when it is appreciated that the automobile has a kinetic energy directly related to the mass of the automobile and to the square of the automobile's speed. By way of illustration, an automobile moving at 40 miles per hour travels approximately four times further before coming to a halt than an automobile travelling at 20 miles an hour. Furthermore, the centrifugal force exerted on a car moving around a curve is four times greater for an automobile travelling 40 miles an hour than for an automobile travelling 20 miles an hour.

Adjusting the speed of an automobile properly to situations ahead of the automobile is an important part of driver training and requires a long period of practice on the part of most students. For example, the student has to develop the proper habits of exerting the right amount of pressure against the accelerator pedal and the brake pedal. Furthermore, the student must learn how to initially depress the gas pedal and the brake pedal and how to subsequently release these pedals so that the proper movements of the automobile can be smoothly controlled. The complexity of driving an automobile can be seen from the fact that proper operation of the gas and brake pedals are only two of the controls required to be exerted by the driver at any instant.

In training apparatus now in use, student drivers are shown a film which has previously been taken of successive portions of a road and roadside area. The students react to the film at successive instants of time in accordance with what they see on the film. However, the students cannot anticipate a situation from one instant to the next as a good driver would under actual driving conditions. Furthermore, the decisions made by a student driver to these situations do not affect the position of the car at a subsequent instant so as to produce a dynamic relationship of cause and effect which occur under actual driving conditions. Because of this, such training apparatus provides only a limited experience to a student in teaching the student to become a good driver. This prevents the training apparatus now in use from being realistic. The training apparatus is also complicated and expensive even though unrealistic.

This invention provides a system which makes it possible to particularly teach a student how to operate the accelerator and brake pedals. The invention teaches the student these important aspects of driving in a safe place which is outside of an actual automobile and which may be disposed in a classroom, home or playroom. The invention also includes auxiliary features which teach a student other important aspects of driving.

The apparatus constituting this invention includes a simulated automobile movable along a road or track and also includes a console which is disposed in front of the movable automobile and which is provided with a seat to correspond to the front seat of an actual automobile. Certain controls including an accelerator pedal and a brake pedal are disposed in the console to control the movements of the automobile. Further controls may include a shift having "neutral," "drive" and "reverse" positions such as occur in automobiles having standard or automatic transmissions. The controls in the console may also include ignition and starter switches, a hand brake and a clutch pedal.

Means are provided for controlling the movements of the automobile in accordance with the operation of the different controls in the console. For example, a first variable impedance is coupled to the accelerator pedal to provide an impedance value related to the amount of actuation of the pedal. The variable impedance is included in electrical circuitry to obtain a movement of the automobile at a speed related to the actuation of the pedal (and upon a release of the hand brake). A second variable impedance is coupled to the brake pedal to provide an impedance value related to the degree of actuation of the brake pedal. This second variable impedance is included in electrical circuitry to obtain a deceleration of the automobile in accordance with the actuation of the brake pedal.

Various other features may be included in the training mechanism constituting this invention. As another illustration, starter means may be included to prevent an automobile from being driven until the ignition and starting switches in the console have been actuated. Means may also be included for inhibiting the operation of the starter switch after the motor for driving the automobile has become energized. By way of further illustration, means may also be included for actuating the seat of the console to pitch the student forward upon a hard actuation of the brake pedal. This forward movement corresponds to the forward pitch experienced by an actual driver when he presses hard against the brake.

Figure 1:
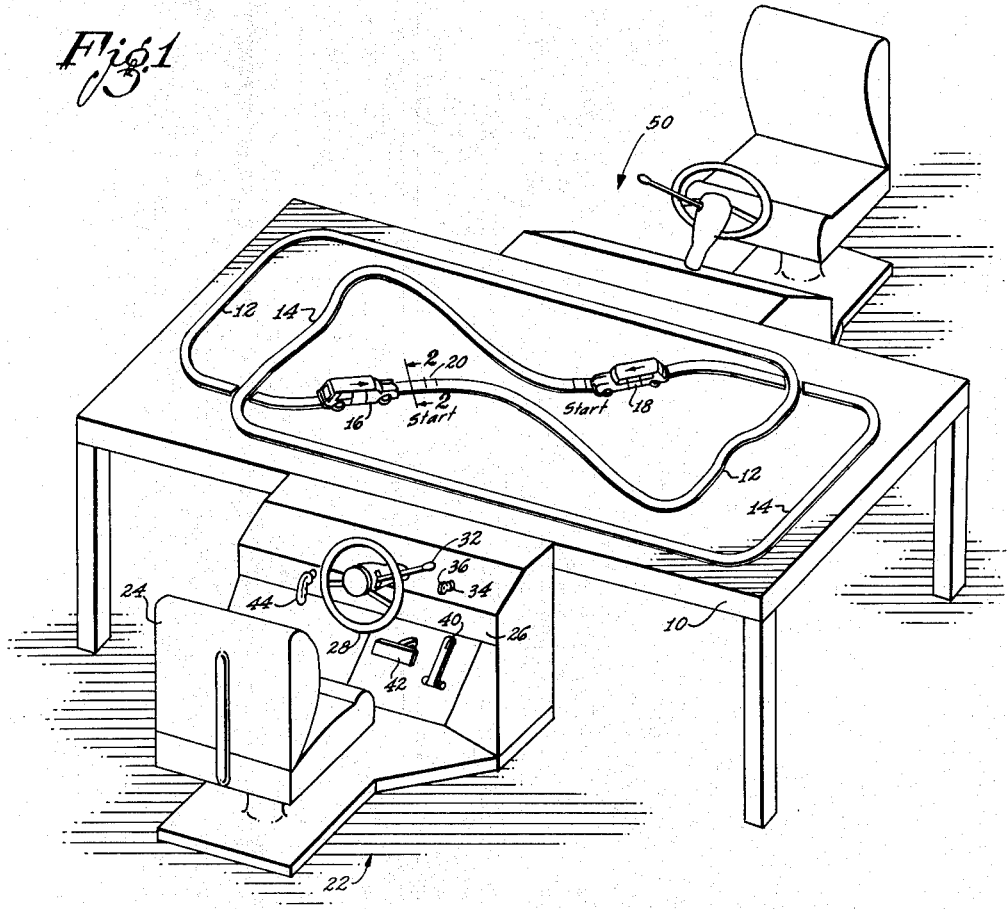
FIGURE 1 is a perspective view of the driver training apparatus constituting this invention and includes a showing of a pair of consoles and control members on one of the consoles, and further includes a showing of a pair of tracks and automobiles movable along the tracks in accordance with the operation of the control members in the consoles.
Figure 3:
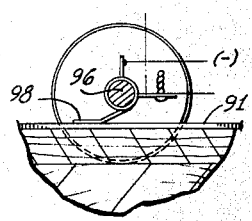
Figure 2:
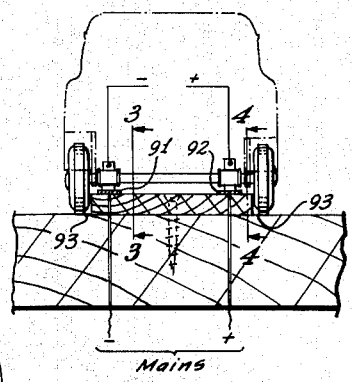
FIGURE 2 is an enlarged rear elevational view of one of the simulated automobiles shown in FIGURE 1, and particularly illustrates the disposition of the automobile relative to its associated track and the disposition of rails for supplying electrical energy to control the movements of the automobile.
Figure 4:
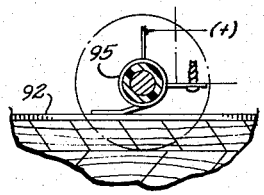
Figure 5:
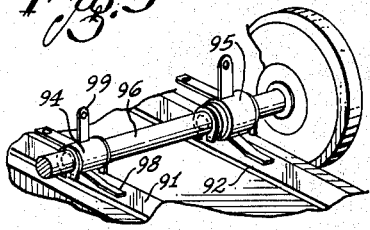
Figure 6:
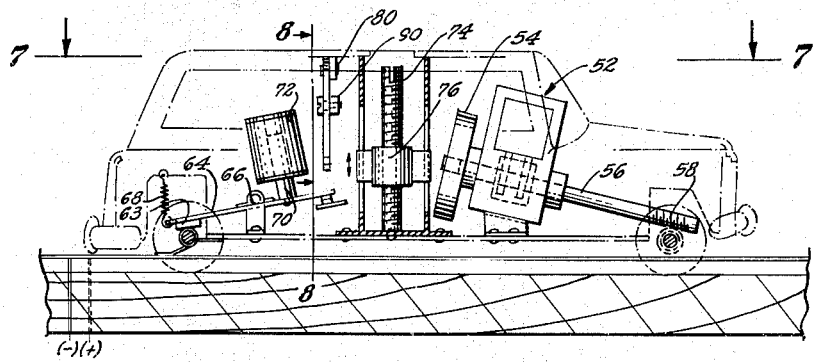
Figure 7:
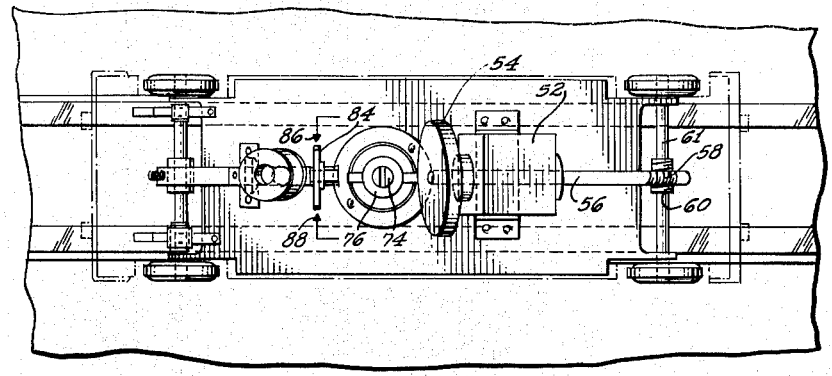
Figure 8:
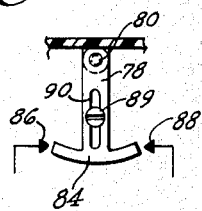
Figure 9:
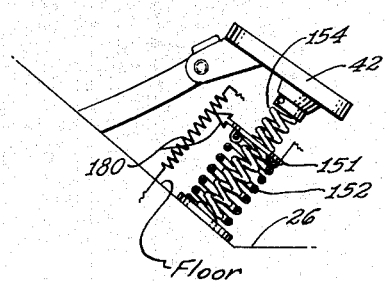

FIGURES 3 and 4 are enlarged sectional views substantially taken respectively on the lines 3—3 and 4—4 on FIGURE 2 and illustrate in further detail the construction of members on the automobile for obtaining an introduction of electrical energy to control the movements of the automobile;

FIGURE 5 is an enlarged fragmentary perspective view ilustrating the construction and relative disposition of the members shown in FIGURE 4 for introducing electrical energy to the automobile to control the movements of the automobile;

FIGURE 6 is an enlarged side elevational view, partly in section, illustrating the construction of members for driving the automobile and of members for stopping the automobile, and further illustrating the construction of members for providing an adjustable center of gravity in the automobile;

FIGURE 7 is an enlarged sectional view substantially on the line 7—7 of FIGURE 6 and further illustrates the construction of the members for driving and stopping the automobile;

FIGURE 8 is an enlarged fragmentary sectional view substantially on the line 8—8 of FIGURE 6 and illustrates the construction of an accelerometer for indicating the safe speed of the simulated automobile when the automobile is traveling around the curve;

FIGURE 9 is an enlarged fragmentary perspective view of a brake pedal included in the console shown in FIGURE 1 and of apparatus associated with the brake pedal for providing a variable impedance in accordance with the actuation of the brake pedal; and FIGURE 10 is a circuit diagram illustrating the electrical circuitry for controlling the movements of the automobile shown in the previous figures and including a showing on an electrical basis of certain members illustrated mechanically in the previous figures.

In the embodiment of the invention shown in the drawings, a table 10 may be adapted to support a road which is simulated by track 12 preferably disposed in a closed loop. A second track 14 may also be disposed on the table 10, preferably in a closed loop. The tracks 12 and 14 may be disposed at the same level so as to intersect each other, may be disposed at different levels or may be provided with an undulant configuration to simulate hills along a road.

Automobiles 16 and 18 are respectively movable along the tracks 12 and 14. The automobiles 16 and 18 may be constructed on a somewhat reduced scale relative to the size of automobiles on a road but may be provided with an external configuration to provide a close simulation as to the appearance of such actual automobiles. The automobiles 16 and 18 may be movable along their respective tracks from a start position to an end position which may be defined by any suitable sensing mechanism such as a switch 20 in FIGURE 10 or a photoelectric cell. The switch 20 may be disposed in the path of movement of the automobile 16 so as to become closed when the automobile 16 moves over the switch.

A console, generally indicated at 22, is movably disposed in front of the table 10 and is provided with a seat 24 corresponding to the driver's seat in an actual automobile. The console 22 is also provided with a front panel 26 corresponding to the front panel of an actual automobile. A steering wheel 28 extends from the panel 26 toward the driver and supports a shift lever 32, as will be described in detail subsequently. The shift lever 32 may be disposed in various positions corresponding to "neutral," "drive" and "reverse." As will be appreciated, these dispositions of the shifting lever occur in cars having either standard or automatic transmission. It should be appreciated that push buttons corresponding to "neutral," "drive" and "reverse" may be used instead of the shifting lever 32 to correspond to the push buttons used in certain makes of automobiles.

A keyhole 34 is provided in the front panel 26 for receiving a key 36 controlling the starting of the simulated automobile 16. The key 36 may be rotated to a first position to close an ignition switch 38 in FIGURE 10 and may be further rotated to a second position to close a starter switch 39 in FIGURE 10. Instead of providing an actuation of the ignition switch 38 and the starter switch 39 by a rotation of the key 36, the closure of the ignition switch 38 may be controlled by the operation of the key 36 and a separate button may be depressed to close the starter switch 39. This latter separation of the ignition and starter switches occurs in automobiles manufactured in years prior to the latest models.

The console 22 may be provided with other controls corresponding to those which actually appear in an automobile. These controls include a gas or accelerator pedal 40, a brake pedal 42 and a hand brake 44. As will be described subsequently, various members including switches are coupled to the accelerator pedal 40, the brake pedal 42 and the hand brake 44 for response in accordance with the actuation of these controls.

Another console generally indicated at 50 is disposed on a side of the table different from the side at which the console 22 is located. The console 50 may be constructed in a manner similar to the console 22 and may be provided with various controls corresponding to those provided for the console 22 as described above. These controls may be provided in the console 50 to direct the movements of the simulated automobile 18 along the track 14. It should be appreciated that actually a plurality of consoles may be used and that more than one console can actually be disposed on the same side of the table. This may be beneficial in teaching the student to be careful of traffic without being diverted by traffic.

The automobile 16 may be driven by a motor generally indicated at 52, which is preferably excited by alternating voltage. For example, the motor 52 may be an induction motor of a conventional type such that its speed at any instant is dependent upon the amplitude of the current applied to its field coil at that instant. A flywheel 54 is mechanically coupled to the motor 52 to simulate the high inertia of an actual automobile. The flywheel 54 is mounted on one end of a shaft 56 having a worm 58 at its other end. The worm 58 engages a worm gear 60 which may be coaxially coupled as by a shaft 61 to one or both of the wheels on the automobile 16 such as one of the front wheels.

The automobile 16 is also provided with a friction brake 63 which may be positioned in contiguous relationship to at least one of the axles on the automobile 16 to frictionally engage the axles when the hand brake 44 or the brake pedal 42 is actuated. The brake 63 may be disposed at one end of a shaft 64 pivotable on a fulcrum as at 66. The shaft 64 is urged by a spring 68 in a direction to position the brake 63 normally away from the contiguous axle on the automobile 16 such as the rear axle. At its other end, the shaft 64 carries an armature 70 which is so disposed relative to a solenoid 72 as to pivot the brake 63 into engagement with the rear axle of the automobile 16 when the solenoid 72 becomes energized. Instead of disposing the brake 63, it is apparent that the brake 63 may also engage any one of the wheels of the automobile 16.

A screw 74 is supported vertically in the automobile 16 and a threaded weight 76 is movable along the screw to adjust the center of gravity of the automobile. An accelerometer 78 is pivotally disposed on a shaft 80 supported horizontally in the automobile and is provided with an arcuate conductive portion 84 at its bottom end. In the position of rest, the arcuate portion 84 is separated by equal distances from a pair of fixedly disposed electrical contacts 86 and 88 so as to engage one of these contacts when the automobile 16 travels at an excessive speed around a curve on the track 12. A weight 89 is adjustably positioned in a slot 90 disposed vertically in the accelerometer so as to control the amplitude of the pivotal movements of the automobile 16 as the automobile travels around a curve.

Each of the roads 12 and 14 may actually be provided with a pair of rails which are electrically isolated from each other to receive different potentials. For example, the track 12 may be provided with a pair of rails 91 and 92 (FIGURE 5) which are electrically isolated from each other to receive alternating potentials of opposite polarities. The rails 91 and 92 are disposed between the left wheels and right wheels of the automobile 16, the wheels riding in depressed portions 93 at the lateral ends of the track 12. A third rail (not shown) may also be disposed between the rails 91 and 92 to provide a ground connection.

A pair of electrically conductive slip rings 94 and 95 are loosely disposed on a shaft 96 supporting a pair of wheels such as the front wheels in the automobile 16 and are disposed in electrically isolated relationship to the shaft. The slip ring 94 carries a brush 98 in slidable relationship to the rail 91 and also carries terminals 99 which are constructed to receive wires such as from the windings in the motor 52 and from the solenoid 72 in the brake assembly. The slip ring 95 also carries a brush and terminals in a manner similar to the slip ring 94.

Electrical circuitry is shown in FIGURE 10 for operation in accordance with the actuation of the different controls on the console 22 including the accelerator pedal 40, the brake pedal 42 and the hand brake 44. This circuitry is instrumental in obtaining the forward and reverse movements of the automobile 16 in accordance with the operation of the different controls on the console and is further instrumental in controlling the speed of movement of the automobile 16 at any instant.

The circuitry shown in FIGURE 10 includes a source 100 of alternating voltage such as may be obtained from wall outlets normally found in any office, home or factory. A manually operable switch 102 is connected to the source 100 to serve as the master switch of the apparatus constituting this invention. The ignition switch 38 and the primary winding of a power transformer 104 are included in a series circuit with the voltage source 100 and the master switch 102.

The secondary winding of the transformer 104 may have a center tap which is connected to a reference potential such as ground. One end terminal of the secondary winding in the transformer 104 has a common connection with a line 106 which extends electrically to the movable arms of the starter switch 39. The stationary contact of the switch 39 is connected to one terminal of the energizing winding 108 in a vibrator 110.

A second terminal of the winding 108 is connected to the movable arm of a single-pole single-throw switch 112 and to the movable arm of a single-pole single-throw switch 114. The stationary contact of the switch 112 has a common connection with the stationary contact of the switch 114 and with one terminal of a relay coil 116. The relay coil 116 is magnetically coupled to the movable arms of the switch 114 and of a switch 118.

The movable arm of the switch 118 has a common connection with the stationary contact of the switch 39 and the stationary contact of the switch 118 extends electrically to the line 106. The second terminal of the relay coil 116 is connected to the stationary contact of a single-pole single-throw switch 120, the movable arm of which is grounded. The movable arm of the switch 120 is mechanically ganged to the movable arm of the switch 39 so as to be closed at the same time that the switch 39 is manually closed.

When energized, the relay coil 116 also controls the operation of a single-pole single-throw switch 124 in addition to the switches 114 and 118. The movable arm of the switch 124 is grounded as is the movable arm of a switch 126. The stationary contacts of the switches 124 and 126 are electrically connected to one terminal of a relay coil 128, which is magnetically coupled to the movable arms of the switches 120 and 126 so as to control the positioning of these movable arms. The second terminal of the relay coil 128 has a common connection with one terminal in a field winding 130 in the motor 52, the second terminal of the field winding being connected through a line 132 to the second end terminal of the secondary winding in the transformer 104.

In addition to the field winding 130, the motor 52 also has a control winding 136. The control winding 136 is in series with a resistance 138 between the second terminal of the relay coil 128 and the stationary contact of a single-pole single-throw switch 140. The movable arm of the switch 140 is mechanically coupled to the hand brake 44 so as to become closed when the hand brake is released.

A pair of switches 144 and 142 are in series across the series circuit provided by the control winding 136, the resistance 138 and the switch 140. The movable arms of the switches 142 and 144 are respectively coupled to the accelerator pedal 40 and to the brake pedal 42 such that the switch 142 becomes closed upon a depression of the accelerator pedal 40 and the switch 144 becomes closed upon a depression of the brake pedal 42. A light bulb 146 having a distinctive color such as a red color is disposed electrically in series with the series combination formed by the switches 142 and 144. It should be appreciated that other types of indicators than the light bulb 146 may also be used.

The movable arm and one stationary contact of a rheostat 150 have a common connection with the stationary contact of the switch 144 and the movable arm of the switch 140. The movable arm of the rheostat 150 is coupled to the accelerator pedal for disposition in accordance with the actuation of the accelerator pedal. This occurs in a manner similar to that which will be described immediately hereafter for the brake pedal 42 and a rheostat associated with the brake pedal. The accelerator pedal 40 may be biased by a spring against actuation in a manner similar to the spring bias exerted against the brake pedal, as will be described immediately hereafter.

The movable arm of a rheostat 180 is coupled to a plate 151 so as to be adjustable in position in accordance with the movements of the plate. The plate 151 is disposed at an intermediate position between the brake pedal 42 and the floor of the console 26. A spring 152 is disposed between the plate 151 and the floor of the console 26. The spring 152 is provided with characteristics to strongly resist the depression of the plate 151 toward the floor. A spring 154 is also disposed against the floor of the console 26 at one end and is disposed against the brake pedal 42 at the opposite end. The spring 154 is provided with characteristics to provide a force against the action of the brake pedal 42, this force being considerably less than that exerted by the spring 152.

A manually adjustable rheostat 156 and the energizing winding 158 of a vibrator 160 are in series between the second stationary contact of the rheostat 150 and the second terminal of the relay coil 128. The second stationary contact of the rheostat 150 is also connected to the movable arm 162 of a stepping switch generally indicated at 164 and having three stationary contacts 166, 168 and 170. The movable arm 162 of the rotary switch 164 is mechanically coupled to the shifting lever 32 so as to engage the stationary contact 166 in the "neutral" position, the stationary contact 168 in the "drive" position and the stationary contact 170 in the "reverse" position.

The stationary contact 168 is connected to the line 132. The stationary contact 170 has a common connection with one end terminal in a rheostat 174, the movable arm and other end terminal of which extend electrically to the line 106. The movable arm of the rheostat 174 is ganged to the movable arm of the rheostat 150 and is coupled to the brake pedal 42 in a manner similar to that shown in FIGURE 9 for disposition in accordance with the actuation of the brake pedal 42.

As will be seen from the subsequent discussion, the rheostat 174 is included to limit the speed of the automobile 16 in the reverse direction such that the reverse movements will correspond to those which actually occur in an automobile. It will be appreciated that the rheostat 174 does not necessarily have to be included in order to complete the working embodiment of the invention.

One terminal of the voltage source 100 is also connected to the movable arm of a single-pole single-throw switch 176 which is mechanically ganged to the accelerator pedal 40. A light bulb 178 having a distinctive color such as yellow is disposed electrically across the switch 176. Although the light bulb 178 is shown in FIGURE 10, other types of indicators may also be used. A connection is made from the stationary contact of the switch 176 to the brake solenoid 72 also shown in FIGURE 6. The other terminal of the solenoid 72 is connected to the movable arm of a rheostat 180. The movable arm of the rheostat 180 is mechanically ganged to the movable arms of a pair of switches 182 and 184 and to the brake pedal 42 so as to be positioned in accordance with the actuation of the brake pedal. The mechanical coupling between the brake pedal 42 and the rheostat 180 is obtained in a manner similar to that shown in FIGURE 9 and described above.

The switches 182 and 184 are in series with the rheostat 180 when closed. A switch 186 is connected across the series arrangement of the rheostat 180 and the switch 182. The movable arm of the switch 186 is mechanically coupled to the hand brake 44 so as to become closed when the hand brake is actuated. The movable arms of the switches 182 and 186 are connected to one terminal of a resistance 188 having its other terminal common with the stationary contact of the master switch 102.

The movable arm of the switch 184 is connected to one terminal of a solenoid 190, the second terminal of which is connected to the movable arm of a rotary switch 192. The movable arm of the switch 192 is mechanically coupled to the movable arm 162 so as to engage one of three stationary contacts in accordance with the positioning of the shifting lever 32 in the "neutral," "drive" and "reverse" positions.

The contacts in the switch 192 corresponding to the "drive" and "reverse" positions are connected to one stationary contact of a rheostat 194, the movable arm of of which is mechanically coupled to the brake pedal 42 in a manner similar to that shown in FIGURE 9. Connections are made from the movable arm and other stationary contact of the rheostat 194 to the stationary contact of the master switch 102.

An armature 196 is magnetically associated with the solenoid 190 for positioning in accordance with the energizing of the solenoid. The armature 196 has at its outer end a piston portion which is mechanically coupled to the seat 24. A spring 198 is coupled at opposite ends to the seat 24 and to a stationary wall 200 and is disposed in constrained relationship to exert a force against the seat 24 in a direction for moving the seat 24 toward the wall 200.

The movable arm of a switch 202 is ganged to the movable arm of the ignition switch 38 so as to become closed when the ignition switch is turned off. The switch 202 may be included in a series circuit with the voltage source 100, the master switch 102, a resistance 204, a switch 206 and an indicator such as a horn 208 or a light bulb of distinctive color. The movable arm of the switch 206 is mechanically coupled to the hand brake 44 so as to become closed when the hand brake is released.

A switch 210 may be disposed electrically between ground and the center tap of the secondary winding in the transformer 104. The movable arm of the switch 210 may be magnetically coupled to a relay coil 212 which is included in a series circuit with the secondary winding of the transformer 104, a resistance 214 and a switch. The switch is included in the accelerometer assembly shown in FIGURE 8 and is defined by the arcuate portion 84 and the contacts 86 and 88. The contacts 86 and 88 are connected together so that the switch becomes closed when the arcuate portion 84 engages either one of the contacts 86 and 88. The switch 210 is normally closed and is opened when the relay 212 is energized.

The switch 20 defining the end of a complete loop in the movement of the automobile 16 is included in a circuit with a counter 220 and a resistance 222 across the voltage source 100. The counter 220 may be constructed in a conventional manner and may be manually set to produce an output signal on a line 224 upon the occurrence of a particular count dependent upon the setting of the counter. A relay coil 226 is included in the line 224 and is magnetically coupled to a switch 228 in the line between the voltage source 100 and the primary winding of the transformer 104.

In order to operate the apparatus constituting this invention, the master switch 102 is manually closed. The key 36 is then inserted in the key hole 34 and is rotated through a first angular distance to close the switch 38. This causes the transformer 104 to become energized from the source 100 so as to prepare the motor 52 for operation. The key 36 is then rotated through an additional distance to start the motor 52.

When the key 36 is rotated through the additional distance, it causes the switches 39 and 120 to close. The switch 112 is also closed at this time provided that the shifting lever 32 is in the neutral position. This may be obtained by constructing the switch 112 in a manner similar to the switch 192 and by connecting the movable arm of the switch 112 to a particular one of the stationary contacts in the switch. Upon the closure of the switches 39 and 120, a continuous circuit is established through the transformer 104, the line 106, the switch 39, the energizing winding 108 of the vibrator 110, the switch 112, the relay coil 116 and the switch 120.

The continuous circuit described in the previous paragraph causes the energizing winding 108 to become energized so as to produce noises simulating the starting of an automobile. The relay coil 116 also becomes energized at the same time and actuates the movable arm of the switches 114 and 118 to obtain a closure of these switches. A holding circuit is thus established which includes the secondary winding of the transformer 104, the line 106, the switch 118, the energizing winding 108 of the vibrator 110, the switch 114, the relay coil 116 and the switch 120.

The switch 124 also becomes closed when the relay coil 116 becomes energized. This prepares the automobile 16 for motion upon a displacement of the shifting lever 32 from the "neutral" position to either the "drive" position or the "reverse" position. As will become apparent subsequently, the automobile 16 can move only when the hand brake 44 is released since the switch 140 becomes closed upon a release of the hand brake.

When the hand brake 44 is released and the gear shift 32 is in the "drive" position, a continuous circuit is established which includes the secondary winding of the transformer 104, the line 132, the stationary contact 168, the movable arm 166, the rheostat 150, the switch 140, the resistance 138, the control winding 136, the relay coil 128 and the switch 124. At the same time, the field winding 130 of the motor 52 is energized through a circuit including the secondary winding of the transformer 104, the line 132, the field winding, the relay coil 128 and the switch 124.

The amplitude of the current flowing through the control winding 136 of the motor 52 is dependent upon the positioning of the movable arm in the rheostat 150. The movable arm of the rheostat 150 is coupled to the accelerator pedal 40 so as to be positioned in accordance with the depression of the pedal. This coupling is such that the effective impedance of the rheostat 150 decreases as the accelerator 40 becomes depressed. This causes current of increased amplitude to flow through the control winding 136 so that a corresponding increase is obtained in the rotational speed of the motor 52. This produces a corresponding increase in the speed at which the automobile 16 is moving at any instant.

The relay coil 128 becomes energized at the time that the automobile 16 starts to move. At such a time the relay coil actuates the movable arm of the switch 126 so as to close the switch. This provides a holding circuit for the energizing of the windings in the motor 52 even after the switch 124 becomes open. The relay coil 128 also actuates the movable arm of the switch 120 so as to open the switch. This prevents the energizing winding 108 of the vibrator 110 and the relay coil 116 from being further energized. In this way, the starting circuitry cannot become effective unless the switch 39 is once again closed by a rotation of the key 36 through the additional distance.

The energizing winding 158 of the vibrator 160 becomes energized at the same time as the motor 52. This causes the vibrator 160 to produce sounds simulating those obtained from the sequential firing of the pistons in an actual automobile. The intensity of the energizing of the solenoid 158 may be controlled by adjusting the movable arm of the rheostat 156. In addition, circuitry is provided for indicating when a student may be actuating the brake pedal 42 with one foot and the accelerator pedal with the other foot. At such times, both of the switches 142 and 144 close to complete the circuit through the light bulb 146. The light bulb 146 then becomes illuminated in a distinctive color, such as red.

The automobile 16 may be driven in a reverse direction as well as in a forward direction. This occurs upon the movement of the shifting lever 32 to the "reverse" position. When this occurs, the control winding 136 is energized by voltage from the line 106 rather than from the line 132. However, the field winding 130 is still energized from the line 132. Since the windings 130 and 136 in the motor 52 now receive voltages of opposite polarities at each instant instead of voltages of corresponding polarities, the motor 52 rotates in an opposite direction from its direction of rotation when the shifting lever 32 is in the "drive" position.

In practically all automobiles now in use, the speed of the automobile in the reverse direction for a particular depression of the accelerator pedal is less than the speed of the automobile in the forward direction for the same depression of the accelerator pedal. This results because of the particular combinations of gears provided for forward and reverse movements. This may be simulated in the automobile 16 by including the rheostat 174 and by coupling the movable arm of the rheostat 174 to the movable arm of the rheostat 150. In this way, an additional impedance is provided in the circuit by the rheostat 174 to reduce the energizing current flowing through the control winding 136 of the motor 52. Since the movable arm of the rheostat 174 is coupled to the accelerator pedal 40, the control winding 136 of the motor 52 becomes energized at any instant in accordance with the depression of the accelecator pedal 40.

Means are also included for obtaining an operation of the brake 63 when either the brake pedal 42 or the hand brake 44 is actuated. The brake 63 can be actuated even before the ignition switch 38 and the starter switch 39 have been closed to energize the motor 52. The brake 63 can be actuated even when the ignition switch 38 is turned off at the time that the automobile 16 is moving. The reason is that the brake circuitry shown in FIGURE 10 is energized from the primary side of the transformer 104 rather than from the secondary side of the transformer. Because of this, the brake circuitry can become operative provided that the master switch 102 is manually closed. It should be appreciated that although the brake circuitry is shown in FIGURE 10 as being energized by alternating voltage, the brake circuitry can also be energized by a direct voltage from a rectifier (not shown) which may be connected to the source 100 of alternating voltage. As alternatives, the accelerator circuitry may be energized by direct current or both the acceleration and brake circuitry may be energized by direct voltage. If desired, for example, the alternating voltage can be superimposed on the direct voltage before introduction to the rails and can be separated by appropriate filters to control the acceleration and deceleration of the automobile. Acceleration of the automobile can also be controlled by alternating signals at one frequency, and deceleration can be controlled by alternating signals at a second frequency.

One way of providing a braking action is to depress the brake pedal 42. When this occurs, the switch 182 becomes closed since the movable arm of the switch is mechanically coupled to the brake pedal 42. This completes a circuit which includes the voltage source 100, the resistance 188, the switch 182, the rheostat 180, the brake solenoid 72 and the switch 176. The switch 176 is closed at this time provided that the student driver is not depressing the accelerator pedal. However, even if the student driver should be depressing the accelerator pedal 40 at the same time that he is depressing the brake pedal 42, a continuous circuit would be established through the brake solenoid 72 and the light bulb 178. The light bulb 178 would then become illuminated in a distinctive color, such as yellow, to indicate that the student driver has operated the different controls improperly.

The amplitude of the energizing current flowing through the brake solenoid 72 at any instant is dependent upon the heaviness with which the brake pedal 42 is depressed. This results from the fact that the movable arm of the rheostat 180 is coupled to the brake pedal 42 so that the effective resistance of the rheostat 180 in the circuit decreases as the brake pedal 42 becomes progressively actuated against the force of the springs 152 and 154. The amplitude of the current flowing through the solenoid 72 in turn controls the torque exerted by the solenoid 72 on the shaft 64 and on the brake 63 in FIGURE 6. In this way, the decelerating force exerted by the brake 63 against the wheels of the automobile 16 is dependent upon the heaviness with which the brake pedal 42 is depressed at any instant.

The action of the brake pedal 42 is similar to that which actually occurs in an automobile. When the brake pedal 42 is first depressed, relatively little resistance against the movement of the brake pedal is encountered until the brake pedal reaches the plate 151. This resistance is provided by the spring 154 and corresponds to the movement of the brake pedal in an actual automobile until the brake pedal reaches the brake fluid. Thereafter, considerable resistance against the movement of the brake pedal 42 is provided by the spring 152 as the spring becomes depressed by a further movement of the brake pedal 42 and the plate 151 toward the floor of the console 26. This corresponds to the opposing action provided by the brake fluid in an actual automobile as the brake pedal becomes further depressed after it has reached the level of the brake fluid.

Since the movable arm of the potentiometer 180 is coupled to the plate 151, its impedance becomes varied only after the brake pedal 42 has reached a level in its downward movement corresponding to the level of the brake fluid in an actual automobile. The level of the plate 151 from the floor of the console 26 can be adjusted if desired to correspond to variations in the amount of brake fluid in an automobile.

A deceleration of the automobile 16 may also be obtained by actuating the hand brake 44. When this occurs, the switch 186 becomes closed since the movable arm of the switch is mechanically coupled to the hand brake 44. This completes a circuit through the brake solenoid 72 in a manner similar to that described above such that the brake 63 becomes pivoted into frictional relationship with the rear wheels on the automobile 16.

The switch 184 becomes closed at the same time as the switch 182 upon an actuation of the brake pedal 42. This completes a circuit to the solenoid 190 such that the solenoid actuates the armature 196 against the action of the spring 198. This causes the piston portion of the armature 196 to jolt the backrest portion of the seat 24 in a forward direction. This forward movement corresponds to the forward pitch of a driver in an automobile under actual driving conditions when he depresses the brake pedal sharply at the time that the automobile is moving.

The rheostat 194 may be included in the circuit with the solenoid 190 so as to control the energizing of the solenoid in accordance with the heaviness with which the brake pedal 42 is depressed. In this way, the student driver is subject to a forward pitch having an intensity dependent upon the manner in which the brake pedal is actuated. The switch 192 may also be included in the circuit with the solenoid 190 so that the student becomes subjected to a forward movement upon deceleration only when the shifting lever 32 is in the operative positions corresponding to "drive" and "reverse."

It is desirable to teach a student driver to reduce speed for traveling around curves, especially when the curves are not properly banked. This is especially important from a safety standpoint since an automobile may leave the road and may even overturn when traveling at excessive speeds around a curve and may cause the occupants of the automobile to become critically injured. The accelerometer 78 is included to provide such an indication to the driver.

As the automobile 16 travels around a curve, centrifugal force is exerted upon the accelerometer 78 (FIGURE 8) to produce a pivotal movement of the accelerometer. This pivotal movement is dependent upon the speed of the automobile 16, upon the sharpness of the curves and upon the center of gravity of the accelerometer represented by the vertical positioning of the weight 89. If the speed should be excessive, the arcuate portion 84 will engage one of the stationary contacts 86 or 88 so as to close the circuit to the relay coil 212. The relay coil 212 will in turn actuate the movable arm of the switch 210 so as to interrupt the supply of alternating voltage to various members shown in FIGURE 10, particularly the motor 52. The supply of voltage to the brake solenoid 72 is not interrupted, however, so that the student may still exert a decelerating force on the automobile by actuating the brake pedal 42 or the hand brake 44.

In using the training apparatus constituting this invention, a student may receive an assignment to drive a simulated automobile such as the automobile 16 along the road or track 12 in as short a time as possible. If he is controlling the movements of the automobile improperly so that the automobile moves too fast into a curve, the car will overturn. This will depend of course upon the position of the center of gravity of the automobile 16 relative to the track 12, such position being adjustable in accordance with the vertical disposition of the weight 76. If the car should not overturn in moving around the curve, it may be considerably delayed by the operation of the accelerometer 78 (FIGURE 8). For example, the introduction of electrical energy to the motor 52 may become interrupted when the conductive portion 84 in the accelerator 78 engages one of the contacts 86 and 88 as a result of an excessive speed by the automobile 16 as the automobile moves around a curve.

It will be seen from the previous paragraph that the student has to increase, maintain or decrease the speed of the automobile properly at each instant in accordance with the situation immediately ahead of the automobile. The student, therefore, has to train his foot to react properly against the accelerator and brake pedals in advance of the situations which are thereafter presented to him. Further, the students' feet will be trained to control the disposition of the accelerator and brake pedals gradually and precisely and without "panic moves."

If several students are being trained simultaneously, they can race each other against time by obtaining movement of their automobiles through one or several laps. The best time for one or several laps can be determined and the winner can be rewarded in some manner. In this way, the training can become an interesting game so as to increase the interest of the student and enhance his learning capabilities.

It is also desirable to teach a student to actuate his hand brake after the ignition switch is turned off. This is accomplished in the driver training mechanism constituting this invention by coupling the switch 202 to the switch 38 so that the switch 202 becomes closed when the switch 38 becomes opened. If the hand brake 44 is not actuated at this time, the switch 206 will be closed. This causes a continuous circuit to be established through the horn 208 so as to indicate to the student driver that the hand brake should be actuated.

It may be desirable to have the student drive the automobile 16 through a plurality of laps on the closed loop defining the road 12. At the end of each lap, the automobile 16 actuates the switch 20 to close the switch. This causes a pulse to be introduced to the counter 220 in FIGURE 10. At a particular count dependent upon the setting of the counter 220, a pulse is produced on the output line 224 of the counter 220 to obtain an energizing of the relay coil 226. This causes the switch 228 to become opened so that voltage cannot be introduced any longer to the primary winding of the transformer 104. In this way, no further electrical energy can be obtained to produce a movement of the automobile 16.

It should be appreciated that not all of the features have to be included in the driver training system constituting this invention in order for the system to be operative for many practical purposes. For example, the starter circuitry including the switch 39 and the relay coil 116 do not necessarily have to be included. By way of further illustration, the circuitry including the relay coil 212 and the circuitry including the horn 208 also do not have to be included in an embodiment of the invention. However, such circuitry provides refinements in teaching a student how to drive and in this respect is desirable.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In apparatus for training students to drive an automobile having a shift with neutral, drive and reverse modes of operation and wherein the apparatus includes a simulated automobile movable along a road and wherein the apparatus includes an accelerator pedal, a brake pedal and a hand brake and a shift having neutral, drive and reverse modes and wherein the accelerator pedal, brake pedal, hand brake and shift are displaced from the simulated automobile and do not follow the movements of the simulated automobile, a motor disposed in the simulated automobile for driving the simulated automobile, means operative in the neutral position of the shift and operatively coupled to the motor and to the shift in the neutral position of the shift to obtain a start of the simulated automobile, means operatively coupled to the start means in the drive position of the shift and to the accelerator pedal and to the motor and responsive to the operation of the accelerator pedal in the drive position of the shift for obtaining a movement of the simulated automobile along the road at speeds related to the operation of the accelerator pedal, means operatively coupled to the start means in the reverse position to the shift and to the accelerator pedal and to the motor and responsive to the operation of the accelerator pedal in the reverse position of the shift for obtaining a movement of the simulated automobile along the road in accordance with the operation of the accelerator pedal in a direction opposite to the direction of movement of the simulated automobile by said last-mentioned means, means operatively coupled to the brake pedal and responsive to the operation of the brake pedal for exerting on the simulated automobile a decelerating force with a magnitude related to the operation of the brake pedal.

2. In apparatus for training students to drive an automobile having a shift with neutral, drive and reverse modes of operation and wherein the apparatus includes a simulated automobile movable along a road and wherein the apparatus further includes an accelerator pedal, a brake pedal and a hand brake and wherein the accelerator pedal, the brake pedal and the hand brake are displaced from the simulated automobile and do not follow the movement of the simulated automobile, a motor included in the simulated automobile for driving the simulated automobile along the road, starting means operative in the neutral position of the shift and connected in an electrical circuit with the motor for providing for an operation of the motor in the neutral position of the shift, means, including switch means operatively coupled to the hand brake and to the shift and connected in the electrical circuit with the motor, for obtaining an operation of the motor upon the release of the hand brake and upon the operation of the shift to the drive position and for preventing the motor from operating upon the actuation of the hand brake, means operatively coupled to the accelerator pedal and responsive to the depression of the accelerator pedal for obtaining an operation of the motor at a speed related to the amount of depression of the accelerator pedal upon the preparation of the motor for operation, and means operative upon an actuation of the brake pedal for obtaining a force opposing the operation of the motor in driving the simulated automobile along the road.

3. In apparatus for training students to drive an automobile having a shift with neutral, drive and reverse modes of operation and wherein the apparatus includes a simulated automobile movable along a road and wherein the apparatus further includes an accelerator pedal, a brake pedal and a hand brake and wherein the accelerator pedal, the brake pedal and the hand brake are displaced from the simulated automobile and do not follow the movements of the simulated automobile, a motor included in the simulated automobile for driving the simulated automobile along the road, starter means operatively coupled to the shift and operative in the neutral position of the shift and connected in electrical circuitry with the motor for providing for the operation of the motor, first switching means coupled to the hand brake for actuation in accordance with the release of the hand brake and connected in the electrical circuitry with the motor, second switching means coupled to the shift and responsive to the different positions of the shift and connected in the electrical circuitry with the motor, means connected in the electrical circuitry with the motor and the second switching means and the first switching means and operatively coupled to the accelerator pedal for obtaining an operation of the motor in accordance with the actuation of the accelerator pedal and upon the release of the hand brake and a disposition of the shift in the drive mode, and means operative upon a release of the accelerator pedal and an actuation of the brake pedal and connected in the electrical circuitry with the motor for obtaining a deceleration of the motor in accordance with the actuation of the brake pedal.

4. In apparatus for training students to drive an automobile having a shift with neutral, drive and reverse modes of operation and wherein the apparatus includes a simulated automobile movable along a road and wherein the apparatus further includes an accelerator pedal, a brake pedal and a hand brake in the apparatus and wherein the accelerator pedal, the brake pedal and the hand brake are displaced from the simulated automobile and do not follow the movements of the simulated automobile, a motor coupled to the simulated automobile for driving the simulated automobile, an ignition switch, a starter switch, starter means connected in electrical circuitry with the ignition switch and the starter switch and the motor for providing for an operation of the motor upon an actuation of the ignition switch and the starter switch, first switching means coupled to the hand brake for actuation in accordance with the operation of the hand brake, and means operatively coupled to the accelerator pedal and responsive to the actuation of the accelerator pedal and connected in the electrical circuitry with the first switching means and the motor and the starter means for providing an operation of the motor and in accordance with the actuation of the accelerator pedal and upon a release of the hand brake and upon an actuation of the ignition switch and the starter switch.

5. In apparatus for training students to drive an automobile having a shift for obtaining forward and reverse movements and wherein the apparatus includes a simulated automobile movable along a road and wherein the apparatus further includes an accelerator pedal, a brake pedal and a hand brake and wherein the simulated automobile is displaced from the accelerator pedal, the brake pedal and the hand brake and is movable independently of the accelerator pedal, the brake pedal and the hand brake, a motor coupled to the simulated automobile for driving the simulated automobile, a first rheostat disposed in the apparatus and coupled to the accelerator pedal for providing a variable impedance in accordance with the depression of the accelerator pedal, a second rheostat disposed in the apparatus and coupled to the brake pedal for providing a variable impedance in accordance with the depression of the brake pedal, first switching means coupled to the hand brake for actuation upon a release of the hand brake, an ignition switch, electrical circuit means including the first rheostat and the first switching means and the motor and the ignition switch for energizing the motor upon the closure of the ignition switch and the actuation of the first switching means and in accordance with the depression of the accelerator pedal to control the variable movements of the simulated automobile, a brake disposed in the simulated automobile for decelerating the simulated automobile, control means coupled to the brake for obtaining an operation of the brake in accordance with the energizing of the control means to control the variable deceleration of the simulated automobile, and electrical circuit means including the second rheostat and the brake-control means for obtaining an energizing of the brake-control means upon the operation of the hand brake or the brake pedal and in accordance with the depression of the brake pedal and regardless of the closure of the ignition switch.

6. In apparatus for training students to drive an automobile and wherein the apparatus includes a simulated automobile movable along a road and wherein the apparatus further includes an accelerator pedal, a brake pedal and a hand brake and wherein the accelerator pedal, the brake pedal and the hand brake are displaced from the simulated automobile and do not follow the movements of the simulated automobile, a motor coupled to the simulated automobile for driving the simulated automobile, first variable impedance means coupled to the accelerator pedal in the apparatus for providing a variable impedance in accordance with the actuation of the accelerator pedal, first switching means coupled to the hand brake for actuation in accordance with the release of the hand brake, electrical circuit means including the first variable impedance means, the motor and the first switching means for energizing the motor in accordance with the actuation of the accelerator pedal and upon an actuation of the first switching means to obtain a variable speed of movement of the simulated automobile, a braking mechanism coupled to the simulated automobile for stopping the simulated automobile, second variable impedance means coupled to the brake pedal in the apparatus for providing a variable impedance in accordance with the actuation of the brake pedal, and electrical circuit means including the second variable impedance means and the braking mechanism and the second member for energizing the braking mechanism in accordance with the actuation of the brake pedal to obtain a variable braking action on the simulated automobile.

7. In apparatus for training students to drive an automobile having a shift with neutral, drive and reverse modes of operation and wherein the apparatus includes a simulated automobile movable along a road and wherein the apparatus further includes an accelerator pedal, a brake pedal and a hand brake and wherein the accelerator pedal, the brake pedal and the hand brake are displaced from the simulated automobile and do not follow the movements of the automobile, a source of voltage, a first rheostat coupled to the accelerator pedal for providing a resistance value in accordance with the amount of depression of the pedal, a second rheostat coupled to the brake pedal for providing a resistance value in accordance with the amount of depression of the pedal, first switching means coupled to the hand brake and connected across the second rheostat for controlling the effect of the rheostat in accordance with the operation of the hand brake, second switching means coupled to the brake pedal for actuation in accordance with an initial actuation of the brake pedal, a braking mechanism in the simulated automobile, the braking mechanism being variably energized to provide a variable braking force on the simulated automobile, first electrical circuit means including the voltage source, the first switching means, the first rheostat and the motor for energizing the motor in accordance with the value of the resistance provided by the first rheostat and upon a release of the hand brake to control the variable speed of the simulated automobile in accordance with the actuation of the accelerator pedal, and second electrical circuit means including the voltage source and the second rheostat and the first and second switching means and operatively coupled to the braking mechanism for obtaining an actuation of the braking mechanism upon an actuation of the hand brake or the brake pedal and for energizing the braking mechanism with a force dependent upon the force applied to the brake pedal.

8. In apparatus for training students to drive an automobile having a shift with neutral, drive and reverse modes of operation and wherein the apparatus includes a simulated automobile movable along a road and wherein the apparatus further includes an accelerator pedal, a brake pedal and a hand brake and wherein the accelerator pedal, the brake pedal and the hand brake are separated from the simulated automobile and do not follow the movements of the simulated automobile means including the wheels of the simulated automobile for driving the simulated automobile, a brake in the simulated automobile and coupled to the wheels of the simulated automobile for decelerating the simulated automobile, control means in the simulated automobile and operatively coupled to the brake for obtaining a variable actuation of the brake in accordance with the variable energizing of the control means to control the variable deceleration of the simulated automobile, first switching means coupled to the hand brake for actuation in accordance with the actuation of the hand brake, second switching means coupled to the brake pedal for actuation in accordance with the actuation of the brake pedal, variable means coupled to the brake pedal for providing an adjustable impedance in accordance with the force applied to the brake pedal, and electrical circuit means including the control means and including the first and second switching means and the variable means for variably energizing the control means in accordance with the value of the impedance provided by the variable means and upon an actuation of the second switching means and for energizing the control means upon an actuation of the first switching means.

9. In apparatus for training students to drive an automobile having a shift with neutral, drive and reverse modes of operation and including a simulated automobile movable along a road and including an accelerator pedal, a brake pedal and a hand brake in the apparatus and including a seat for supporting the student performing the driving operation on the simulated car and including a motor in the automobile for driving the simulated automobile, a brake coupled to the simulated automobile for stopping the simulated automobile in accordance with the braking force applied to the simulated automobile, first switching means coupled to the brake pedal for actuation in accordance with the actuation of the brake pedal, control means coupled to the brake pedal for providing a variable impedance in accordance with the actuation of the brake pedal, electrical circuitry including the first switching means and the control means for providing an actuation of the brake in accordance with the variable impedance provided by the control means and upon the actuation of the brake pedal, means including a movable member operatively coupled to the seat and to the brake pedal for actuating the seat in accordance with the actuation of the brake pedal to obtain a forward pitch of the student upon a deceleration of the simulated automobile, and means operatively coupled to the accelerator pedal and to the motor in the automobile for obtaining an energizing of the motor in accordance with the actuation of the accelerator pedal to control the speed of the automobile.

10. In combination for teaching a student to drive a simulated automobile along a road where the automobile includes a plurality of wheels disposed on the road, a console for seating the student, a plurality of controls for the automobile and including an accelerator pedal and brake-control means, the controls in the plurality being disposed in the console, a motor disposed in the automobile for driving the automobile, switching means coupled to the braking means for actuation in accordance with the actuation of the braking means, means coupled mechanically to the accelerator pedal and included in electrical circuitry with the motor and with the switching means for obtaining an energizing of the motor in accordance with the actuation of the accelerator pedal upon the release of the brake-control means to obtain a movement of the automobile at a speed related to the actuation of the accelerator pedal, brake-energizing means, a mechanical brake operatively coupled to the brake-energizing means and responsive to the brake-energizing means for actuation in accordance with the energizing of the brake-energizing means and disposed in the automobile against the wheels of the automobile for producing a deceleration of the automobile in accordance with the actuation of the brake, and means coupled mechanically to the brake-control means and included in electrical circuitry with the switching means and responsive to the particular actuation of the brake-control means for obtaining an energizing of the brake-energizing means upon an actuation of the brake-control means and in accordance with such actuation.

11. In combination for teaching a student to drive a simulated automobile along a road where the simulated automobile includes a plurality of wheels movable along a road, a console for seating the student, a plurality of controls for the automobile and disposed in the console and including an accelerator pedal, a brake pedal and a hand brake, a mechanical brake disposed in the automobile against the wheels of the automobile for decelerating the automobile, brake-energizing means disposed in the automobile and coupled to the brake for actuation of the brake in accordance with the energizing of the brake-energizing means, a variable impedance disposed in the console and coupled to the brake pedal for variation in impedance in accordance with the degree of actuation of the brake pedal, first switching means disposed in the console and coupled to the brake pedal for actuation in accordance with the actuation of the brake pedal, second switching means disposed in the console and coupled to the hand brake for actuation in accordance with the actuation of the hand brake, electrical circuitry including the brake-energizing means, the variable impedance and the first and second switching means for energizing the brake-energizing means upon the actuation of the second switching means to represent an actuation of the hand brake and for controlling the energizing of the brake-energizing means in accordance with the value of the variable impedance and only upon the actuation of the first switching means to represent an actuation of the brake pedal, a motor disposed in the automobile for driving the automobile, and electrical circuitry including the motor and operatively coupled to the accelerator pedal for obtaining a movement of the automobile in accordance with the actuation of the accelerator pedal.

12. In combination for teaching a student to drive a simulated automobile along a road, a console for seating the student, a plurality of controls for the automobile and disposed in the console and including an accelerator pedal and a hand brake and including a shift having drive and reverse positions for respectively obtaining a forward or backward movement of the automobile, a motor coupled to the automobile for driving the automobile, switching means disposed in the console and coupled to the hand brake for actuation in accordance with the actuation of the hand brake, a variable impedance disposed in the console and coupled to the accelerator pedal for providing an impedance having a value dependent upon the actuation of the accelerator pedal, first electrical circuitry including the motor, the switching means and the variable impedance and operative upon the release of the hand brake and upon the disposition of the shift in the drive position for obtaining an energizing of the motor in accordance with the value of the variable impedance to obtain a movement of the automobile in the forward direction at a speed dependent upon the value of the variable impedance, and second electrical circuitry including the motor, the switching means and the variable impedance and operative upon the release of the hand brake and upon the disposition of the shift in the reverse position for obtaining an energizing of the motor in accordance with the value of the variable impedance to obtain a movement of the automobile in the backward direction at a speed dependent upon the value of the variable impedance.

13. In combination for teaching a student to drive a simulated automobile along a road, a console for seating the student, a plurality of controls for the automobile and disposed in the console and including an accelerator pedal and a hand brake and including a shift having a plurality of positions including drive and neutral positions for controlling the movement of the automobile, a motor coupled to the automobile for driving the automobile, a variable impedance disposed in the console and coupled to the accelerator pedal for the production of a variable impedance in accordance with the actuation of the accelerator pedal, switching means disposed in the console and provided with a plurality of contacts corresponding to the different positions of the shift and coupled to the shift for actuation to the different contacts in the plurality in accordance with the operation of the shift, and electrical circuitry including particular contacts of the switching means, the motor and the variable impedance for obtaining an energizing of the motor in accordance with the operation of the variable impedance to drive the automobile at a speed related to the value of the impedance and upon the disposition of the shift in the drive position, the different contacts in the switching means being connected in the electrical circuitry to obtain a de-energizing of the motor upon a disposition of the shift in the neutral position.

14. In apparatus for training students to drive an automobile and including a simulated automobile movable along a road and including a console in the apparatus and a seat in the console for holding a student driver and further including an accelerator pedal and a brake pedal displaced from the automobile and having an immobile disposition, means including electrical circuitry operatively coupled to the brake pedal and responsive to the actuation of the accelerator pedal and operative upon the simulated automobile for obtaining controlled accelerations of the simulated automobile in accordance with such actuation, means including electrical circuitry operatively coupled to the brake pedal and responsive to the actuation of the brake pedal and operative upon the simulated automobile for obtaining controlled decelerations of the simulated automobile in accordance with such actuations, and means operatively coupled to the seat in the console and to the brake pedal and responsive to the actuation of the brake pedal for obtaining a forward pitch of the seat corresponding to that produced in an actual automobile upon deceleration of the simulated automobile.

15. In apparatus for training students to drive an automobile and including a simulated automobile movable along a road and including a console in the apparatus for holding a student driver and including an ignition switch and a starter switch in the console and including a shift lever and an accelerator pedal in the console, voltage supply means connected in electrical circuitry with the ignition switch and responsive to the actuation of the ignition switch for obtaining a supply of voltage, a motor included in the simulated automobile for driving the simulated automobile, first electrical circuit means including the voltage supply means and including the starter switch and the ignition switch and the motor for providing for an operation of the motor upon the actuation of the starter switch and after the actuation of the ignition switch, second electrical circuit means including the motor and operatively coupled to the first electrical circuit means and operatively coupled to the shift lever and the accelerator pedal for obtaining a variable energizing of the motor in accordance with the variable actuation of the accelerator pedal and the shift lever to control the variable speed of the simulated automobile, and means operatively coupled to the first electrical circuitry and the second electrical circuitry for obtaining a de-energizing of the first electrical circuitry upon an energizing of the motor through the second electrical circuitry.

References Cited by the Examiner

UNITED STATES PATENTS

| | | | |
|---|---|---|---|
| 1,966,145 | 7/1934 | Spotz | 46—244 |
| 2,269,444 | 1/1942 | Durham et al. | 35—11 |
| 2,273,091 | 2/1942 | DeSilva | 35—11 |
| 2,463,602 | 3/1949 | Dehmel | 35—12 |
| 2,695,783 | 11/1954 | Serafin | 35—12 |
| 2,700,227 | 1/1955 | Arkell | 35—11 |
| 2,742,714 | 4/1956 | Allgaier | 35—11 |
| 2,870,548 | 1/1959 | Chedister | 35—11 |
| 2,993,299 | 7/1961 | Dingee et al. | 46—249 |

FOREIGN PATENTS 820,165  11/1937  France.

EUGENE R. CAPOZIO, Primary Examiner.

GEORGE HYMAN, Jr., LEO SMILOW, GEORGE A. NINAS, Jr., JEROME SCHNALL, Examiners.